United States Patent
Stepanich et al.

(10) Patent No.: US 8,000,686 B2
(45) Date of Patent: Aug. 16, 2011

(54) EXTENSIBLE PHONE APPLICATION

(75) Inventors: Darron Jack Stepanich, Seattle, WA (US); Kevin Alan Kennedy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 10/401,009

(22) Filed: Mar. 26, 2003

(65) Prior Publication Data

US 2004/0209607 A1    Oct. 21, 2004

Related U.S. Application Data

(60) Provisional application No. 60/420,359, filed on Oct. 21, 2002.

(51) Int. Cl.
*H04M 3/42* (2006.01)

(52) U.S. Cl. ...... 455/414.1; 455/417; 455/418; 455/419; 455/456.3; 455/555; 455/566; 379/142.01; 379/142.08; 379/142.14; 379/142.17; 379/93.23; 379/93.25

(58) Field of Classification Search ...... 455/414.1, 455/418, 419, 456.3, 566, 417, 555; 379/142.01, 379/142.06, 142.14, 142.17, 93.23, 93.25, 379/142.08

See application file for complete search history.

(56) References Cited

U.S. PATENT DOCUMENTS

| | | | | |
|---|---|---|---|---|
| 5,745,850 A | * | 4/1998 | Aldermeshian et al. | 455/417 |
| 5,987,104 A | * | 11/1999 | Tomimori | 379/93.23 |
| 6,243,448 B1 | * | 6/2001 | Corbett et al. | 379/93.35 |
| 6,331,972 B1 | * | 12/2001 | Harris et al. | 370/313 |
| 6,456,857 B1 | * | 9/2002 | Bos et al. | 455/550.1 |
| 6,512,819 B1 | * | 1/2003 | Sato et al. | 379/93.23 |
| 6,687,901 B1 | * | 2/2004 | Imamatsu | 717/173 |
| 7,120,429 B2 | * | 10/2006 | Minear et al. | 455/419 |
| 2001/0034237 A1 | * | 10/2001 | Garahi | 455/456 |
| 2002/0087628 A1 | * | 7/2002 | Rouse et al. | 709/203 |
| 2002/0193094 A1 | * | 12/2002 | Lawless et al. | 455/407 |
| 2003/0022659 A1 | * | 1/2003 | Mun et al. | 455/415 |
| 2004/0022384 A1 | * | 2/2004 | Flores et al. | 379/265.13 |
| 2005/0026603 A9 | * | 2/2005 | Rajaram | 455/419 |

* cited by examiner

*Primary Examiner* — Quynh H Nguyen
(74) *Attorney, Agent, or Firm* — Merchant & Gould (57) ABSTRACT

The present invention provides an extensible phone application that uses extensions to interact with other applications executing in a mobile communication device. The extensible phone application is operable to handle wireless communication for the mobile communication device. Another application may interact with the extensible phone application by incorporating an extension. The extensible phone application enables the extension to register with the phone application for receiving a notification associated with an event. In response to the event, the extensible phone application sends the notification to the extension.

40 Claims, 7 Drawing Sheets

EXTENSIBLE PHONE APPLICATION

CLAIM OF PRIORITY

This application claims the benefit of U.S. Provisional Application No. 60/420,359, filed on Oct. 21, 2002.

BACKGROUND OF THE INVENTION

Mobile telephones are increasingly becoming more than just wireless voice communication devices. In addition to handling voice data, some modern mobile telephones are essentially portable computing devices that can support a variety of applications such as email, Web browser, note and word processing applications, contact applications, scheduling applications, games, and the like. However, these applications are often coded by different developers and typically have limited interaction with each other.

SUMMARY OF THE INVENTION

Briefly stated, the present invention provides an extensible phone application that uses extensions to interact with other applications executing in a mobile communication device. The extensible phone application is operable to handle wireless communication for the mobile communication device. Another application may interact with the extensible phone application by incorporating an extension. The extensible phone application enables the extension to register with the phone application for receiving a notification associated with an event. In response to the event, the extensible phone application sends the notification to the extension.

In one aspect, the invention is directed at a computer-implemented method for configuring an application in a mobile communication device. The computer-implemented method includes an extension in the application. The extension is operable to communicate with an extensible phone application configured to handle wireless communication for the mobile communication device. The extension may register with the extensible phone application. In response to receiving a notification from the extensible phone application associated with a wireless communication event, the application performs an operation based the notification.

In another aspect, the invention is directed at a computer-implemented method for configuring a mobile communication device. The computer-implemented method provides an extensible phone application and another application to the mobile communication device. The extensible phone application is configured to handle wireless communication for the mobile communication device. The other application is configured with an extension for interacting with the extensible phone application. The computer-implemented method registers the extension with the extensible phone application to receive a notification in response to an event, such as a call.

In yet another aspect, the invention is directed at a method of communicating between an extensible phone application and another application in a mobile communication device. The method enables the other application to communicate with the extensible phone application using an extension. The other application sends a notification request for an event associated with wireless communication to the extensible phone application. The extensible phone application receives the notification request, determines an occurrence of the event identified in the notification request, and sends a notification associated with the event to the other application.

In still another aspect, the invention is directed at a mobile communication device with a memory encodes with an extensible phone application and a second application. The extensible phone application is configured to handle wireless communication for the mobile communication device, to determine an event related to wireless communication, and to send a notification associated with the event to an extension registered with it. The notification includes data about the event. The second application is configured with the extension. The second application is further configured to receive the notification and to incorporate the data about the event in an operation.

In still yet another aspect, the invention is directed at a computer-readable medium encoded with a data structure that includes three data fields. The first data field has a first computer-executable component configured to enable an extension to register with it and to send a notification associated with an event to the extension in response to the event. The second data field has with a second computer-executable component. The third data field is incorporated into the second data field. The third data field has the extension configured with computer-executable instructions for interacting with the first computer-executable component.

DETAILED DESCRIPTION OF THE PREFERRED EMBODIMENT

The inventors of the present invention have determined that a mobile communication device that is configured to readily integrate applications into its operations will greatly enhance the capabilities of the device. The inventors have also appreciated that a mobile communication device configured in such an application-friendly manner will encourage more developers to create software for the device. Thus, the present invention focuses on an extensible phone application for a mobile communication device that enables other applications in the device to efficiently and effectively interact with it. The extensible phone application is configured to handle wireless communication for the mobile communication device. The extensible phone application is also configured to provide extensions that may be used by other applications in the mobile communication device to access data and features associated with wireless communication. For example, applications may use these extensions to register to receive notifications for specific events associated with wireless communication and to interact with the extensible phone application.

A mobile communication device with an extensible phone application provides a superior platform for applications created by software developers. The extensible phone application enables developers to enhance and extend the functionality of the device to meet their own specific needs. The extensible phone application also enables developers to implement custom solutions that meet hardware and wireless carrier requirements. These and other aspects of the invention will become apparent after reading the following detailed description.

Figure 1:
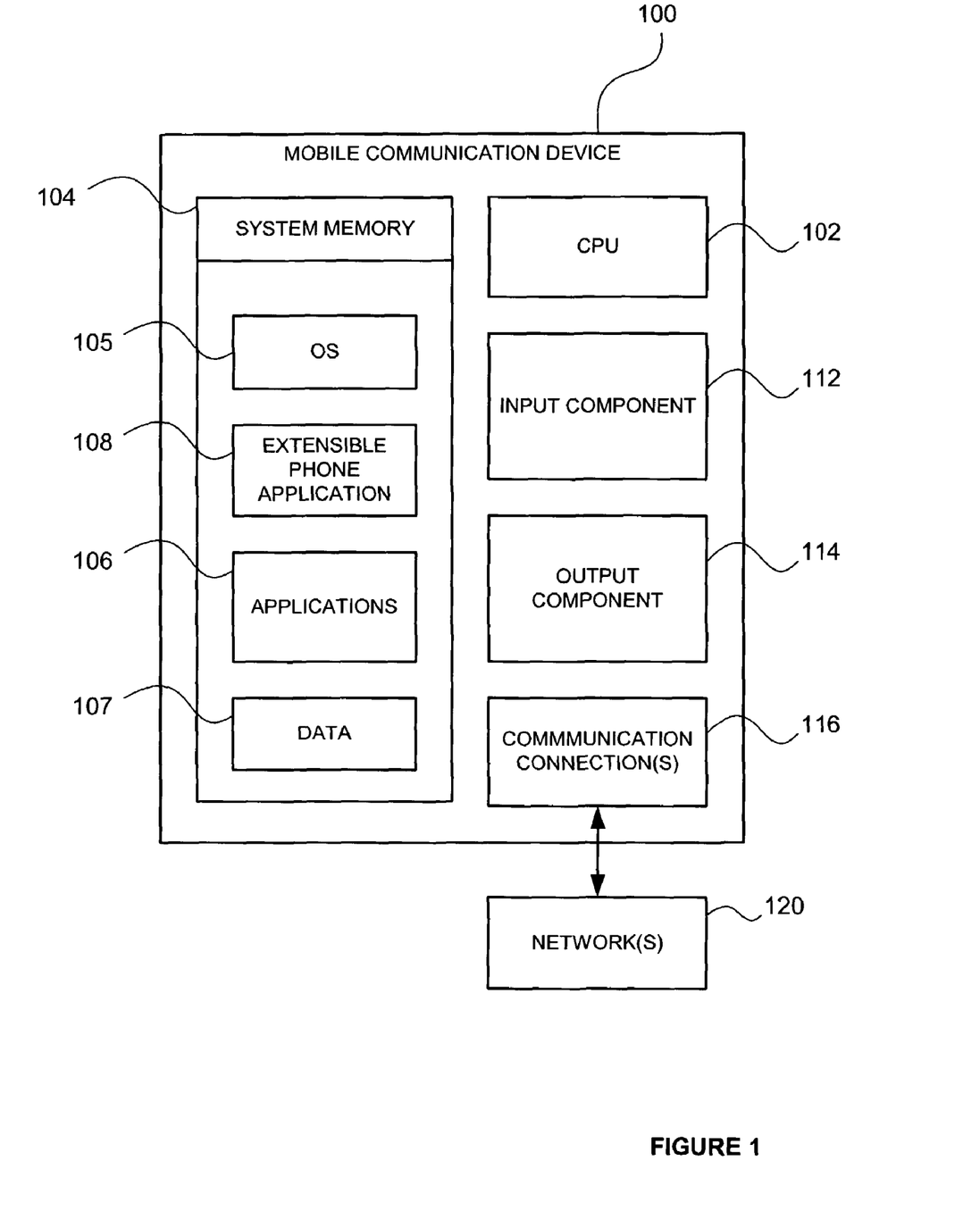
FIG. 1 illustrates an exemplary mobile communication device.

FIG. 1 illustrates an exemplary mobile communication device 100 that may be used in one exemplary embodiment of the present invention. It is to be understood that many different kinds of mobile communication devices may implement this invention. These mobile communication devices include wireless phones, personal digital assistants, laptop and portable computers, and the like. For illustrative purposes, a general mobile communication device 100 will be described. A mobile communication device that is capable of implementing this invention may have more, less, or different components as those shown in FIG. 1.

Mobile communication device 100 may include various hardware components. In a very basic configuration, mobile communication device 100 typically includes a central processing unit 102, system memory 104, and one or more communication connections 116. Depending on the exact configuration and type of mobile communication device, system memory 104 may include volatile memory, non-volatile memory, data storage devices, or the like. These examples of system memory 104 are all considered computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by mobile communication device 100. Any such computer storage media may be part of device 100. Mobile communication device 100 may also contain input component 112 for inputting data and output component 114 for displaying data.

Mobile communication device 100 may also contain communication connections 116 that allow the device to communicate with other mobile communication devices over network 120, such as a wireless network, local area network, wide area network such as the Internet, and other communication networks. Signals generated by communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Software components of mobile communication device 100 are typically stored in system memory 104. System memory 104 typically includes an operating system 105, one or more applications 106, an extensible phone application 108, and data 107. Extensible phone application 108 may be an independent component or be incorporated into operating system 105. Extensible phone application 108 and extensions will be discussed in more detail in conjunction with FIG. 2. Briefly stated, extensible phone application 108 is a computer-executable component that handles wireless communication for mobile communication device 100. Extensible phone application 108 is configured to use extensions to interact with applications 106.

Applications 106 are computer-executable components that operate in mobile communication device 100. Applications 106 may use extensions for interacting with extensible phone application 108. These extensions may be implemented in a variety of ways. In one embodiment of the invention, extensions are incorporated in applications 106. The extensions may register with extensible phone application 108 to receive information from, to communicate with, and to control the operations of extensible phone application 108.

Figure 2:
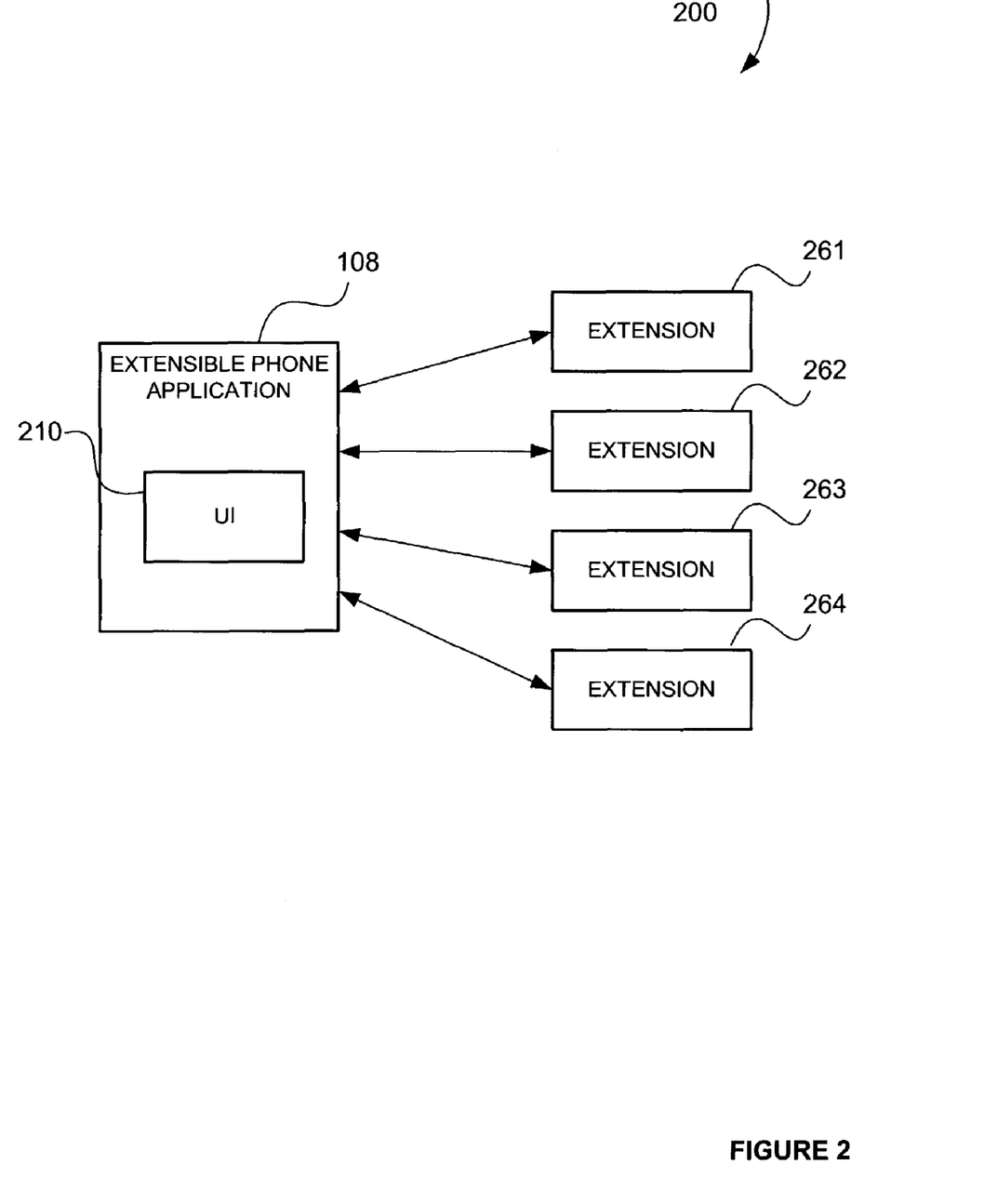
FIG. 2 is a schematic diagram of an exemplary extensible phone application system.

FIG. 2 is a schematic diagram of an exemplary extensible phone application system 200. Illustrated are an extensible phone application 108 and extensions 261-264. Extensible phone application 108 is a software component of a mobile communication device. Extensible phone application 108 enables a user to control the operations of mobile communication device associated with wireless voice and data communication. As illustrated in the figure, extensible phone application 108 is configured to provide a user interface 210 for interacting with a user. User interface 210 may display information to the user and to enable the user to issue commands.

Extensible phone application 108 is also configured to interact with other applications executing on the mobile communication device. Extensible phone application 108 may interact with the other applications using extensions, such as extensions 261-264. Extensions 261-264 are software devices that may be implemented by applications executing on the mobile communication device to interact with extensible phone application 108.

In operation, extensions 261-264 may register with extensible phone application 108 to request for various types of interactions. Many types of interactions are possible. For example, extensible phone application 108 may send notifications to extension 261-264. Notifications may include an indicator for an event, such as new call, call ended, call on hold, and the like. Notifications may also include data, such as caller ID, wireless carrier information, location information, etc. The applications may also send data to and control certain operations of extensible phone application 108. Extensible phone application 108 may incorporate the data in user interface 210. The data may be incorporated without disrupting the operations of the extensible phone application 108.

Figure 3:
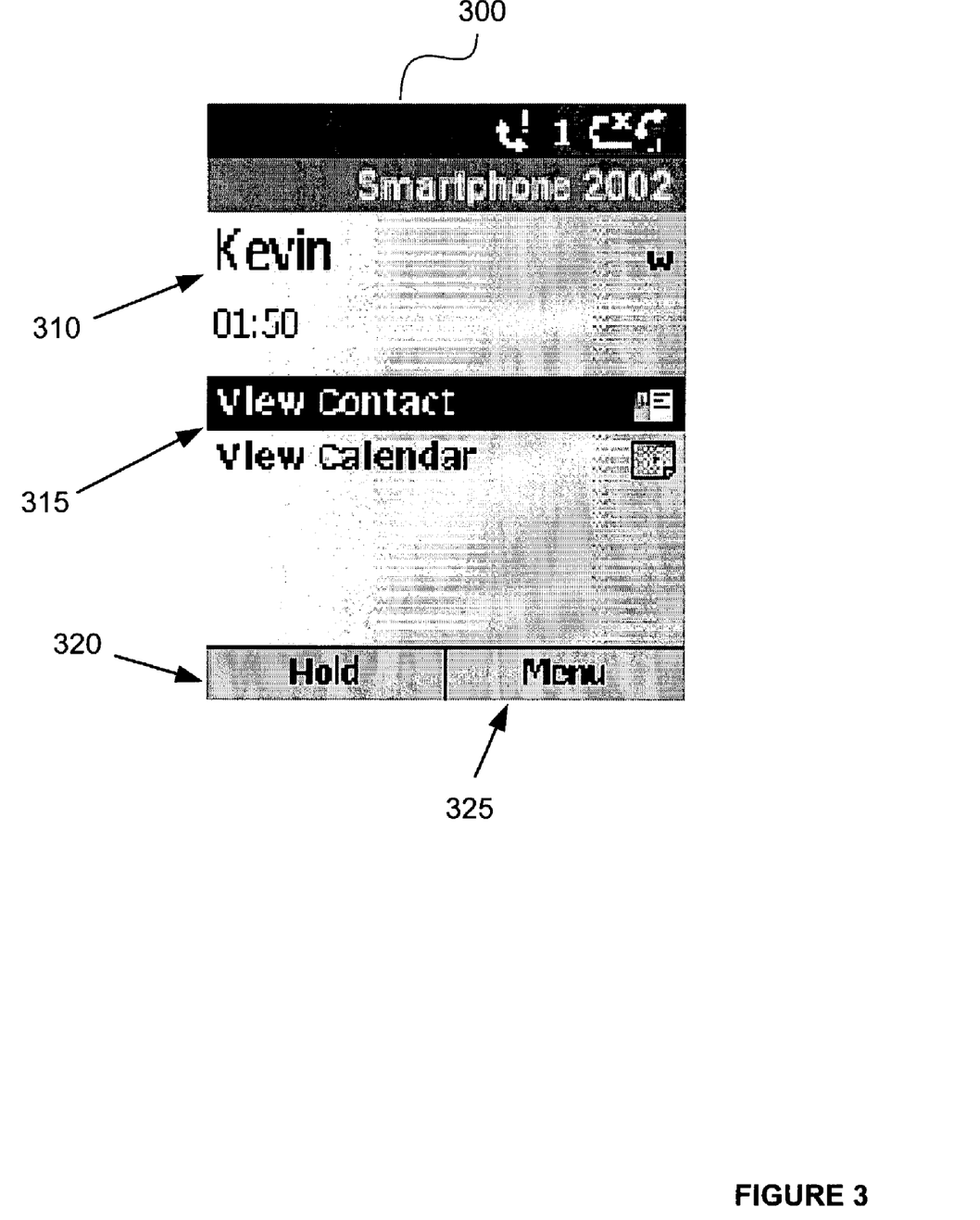
FIG. 3 is a screenshot of an exemplary user interface without displaying data from any installed extension.
Figure 4:
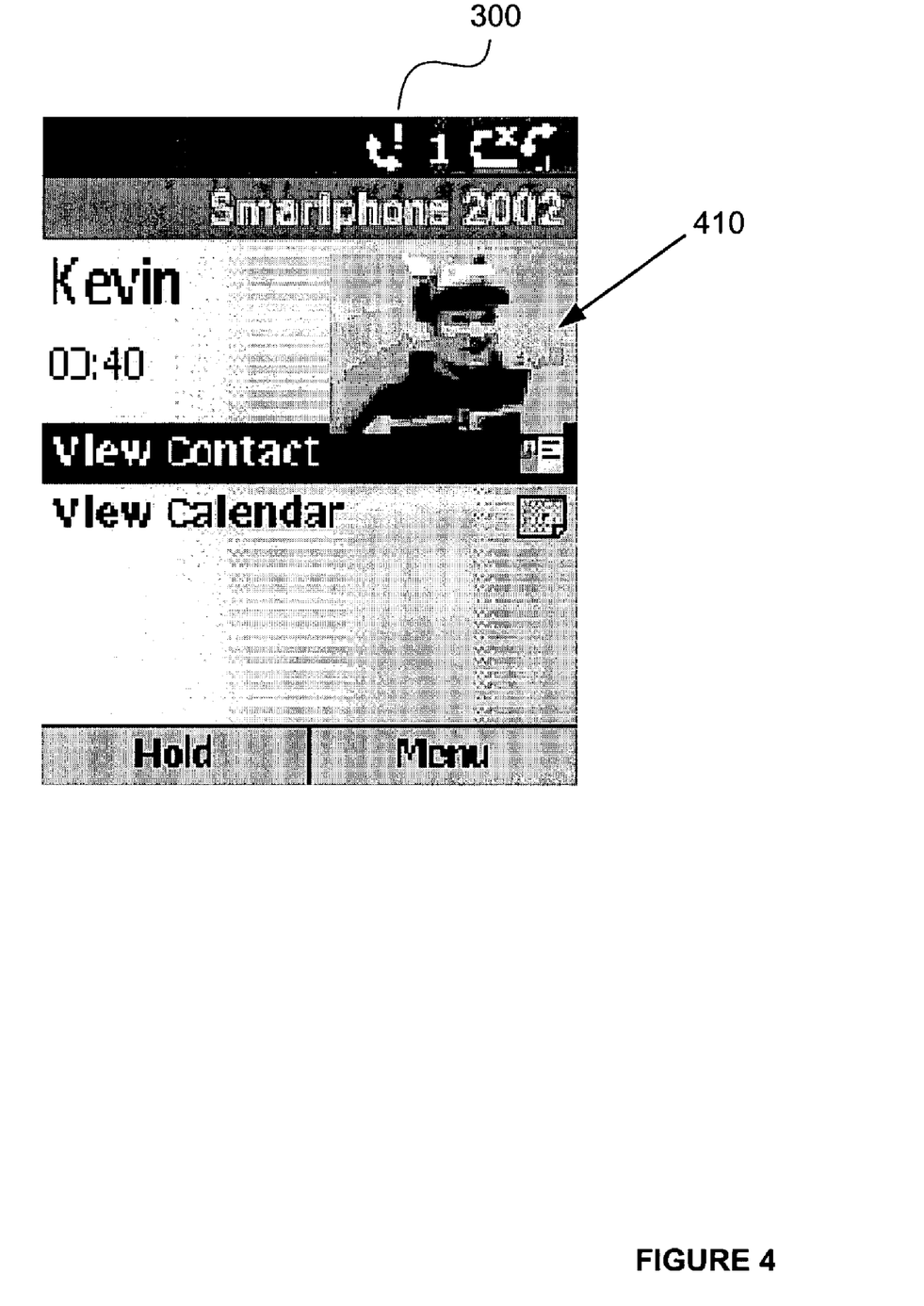
FIG. 4 is another screenshot of an exemplary user interface displaying data from a picture caller ID extension.

FIGS. 3 and 4 are screenshots of an exemplary user interface 300 of an extensible phone application. FIG. 3 is a screenshot of the exemplary user interface 300 without displaying data from any installed extension. User interface 300 may be displayed on a touch screen of a mobile communication device. User interface 300 includes a data display area 310 for displaying data related to phone calls. As illustrated, the data display area 310 displays the caller ID of a call, which shows that the caller is Kevin. User interface 300 may also include an application selection menu 315, a call hold trigger 320, a menu activation trigger 325, and other display and user selectable items. A user may issue commands to the extensible phone application by activating the triggers. For example, a user may elect to hold a call by pressing on the touch screen where call hold trigger 320 is displayed.

FIG. 4 is another screenshot of the exemplary user interface 300 displaying data from a picture caller ID extension. In this example, the extensible phone application is interacting with a picture caller ID application. The picture caller ID application is configured to determine a digital photograph associated with a caller ID. The picture caller ID application includes an extension for interacting with the extensible phone application. The extension may be incorporated into the picture caller ID application.

Using the extension, the picture caller ID application is configured to register with the extensible phone application and to receive a notification for a caller ID. After determining a digital photograph associated with the caller ID, the picture caller ID application is also configured to display the digital photograph on user interface 300. Many configurations are possible for the picture caller ID application to display the digital photograph. For example, the picture caller ID application may configure user interface 300 to display the digital photograph. The picture caller ID application may also send the digital photograph to the extensible phone application so that the extensible phone application can display it on user interface 300. As shown in the screenshot, a photo of Kevin is displayed in the data display area 310 to show that Kevin is the caller.

Figure 5:
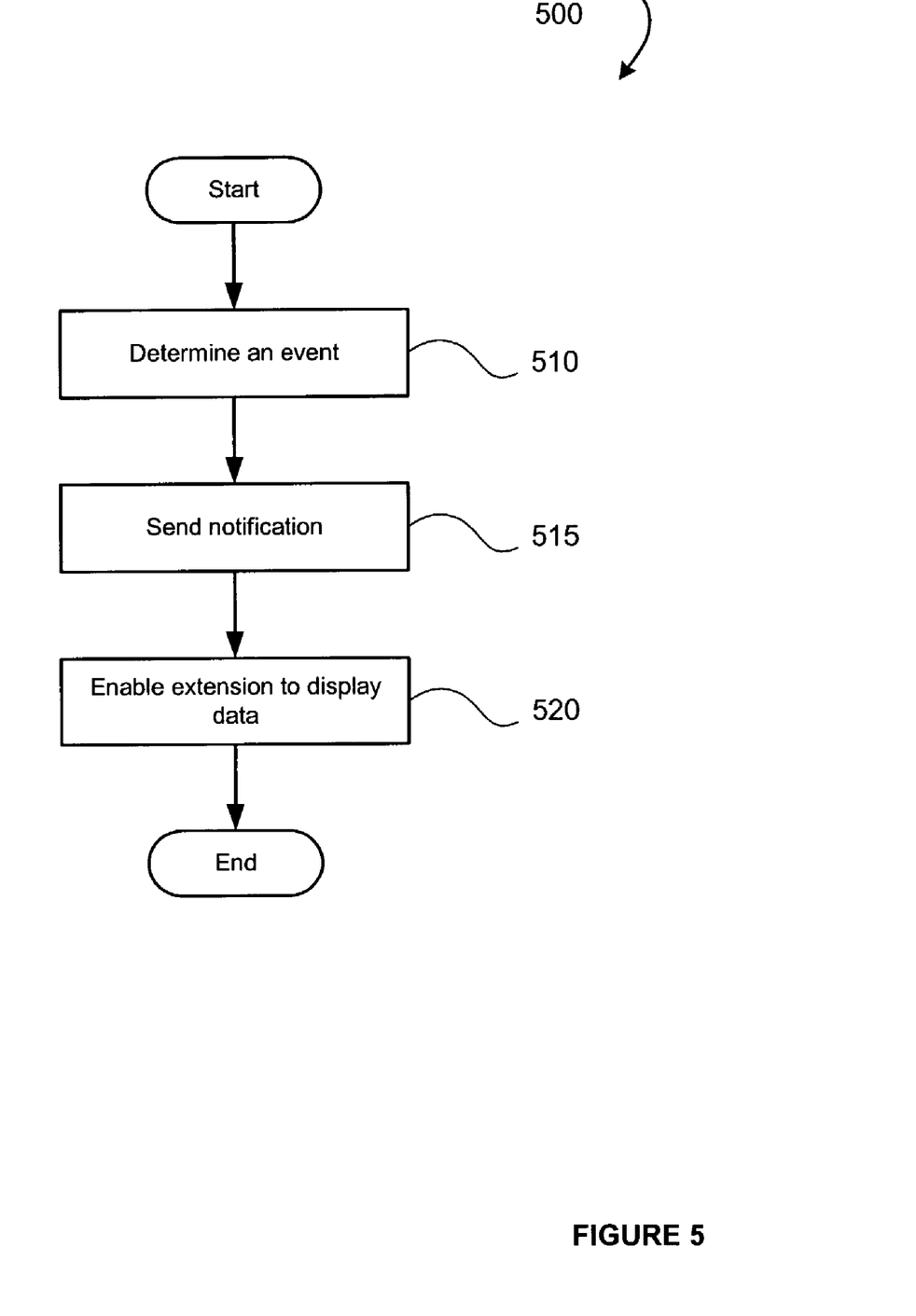
FIG. 5 is an operational flow diagram of an exemplary process that may be used by an extensible phone application to interact with extensions.

FIG. 5 is an operational flow diagram of an exemplary process 500 that may be used by an extensible phone application to interact with extensions. Moving from a start block, process 500 goes to block 510 where an event is determined. The event may be any wireless communication related event. At block 515, a notification of the event is sent to one or more extensions that are registered to receive such notifications. Each extension is associated with an application. At block 520, the extensible phone application enables the extensions to display the data. For example, the extensible phone application may receive data from an application through an extension. The extensible phone application then displays the data on a user interface. The extensible phone application may also enable the extension to directly display the data on a user interface. Process 500 then ends.

Figure 6:
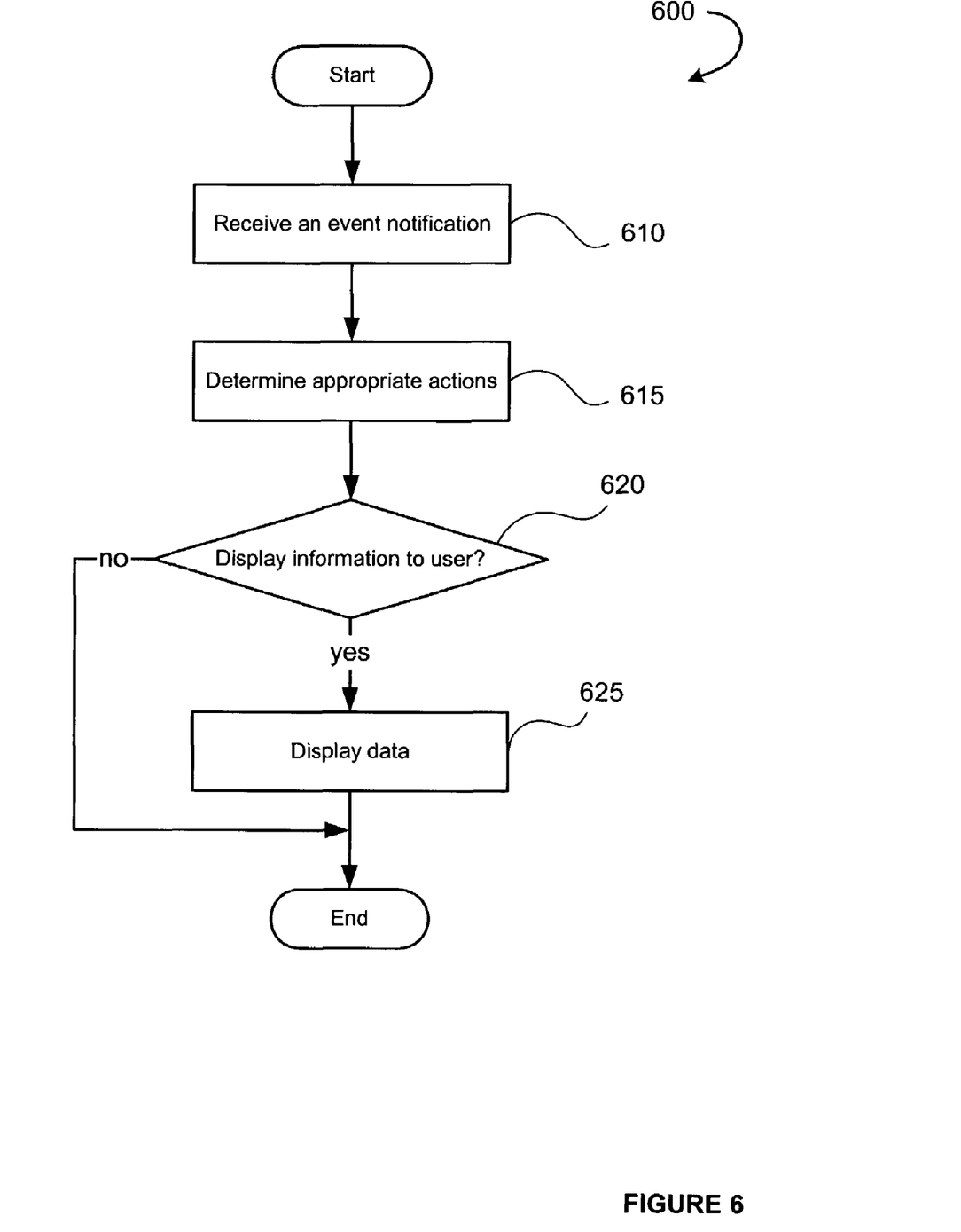
FIG. 6 is an operational flow diagram of an exemplary process that may be used by an application to interact with an extensible phone application.

FIG. 6 is a schematic flow diagram of an exemplary process 600 that may be used by an application to interact with an extensible phone application. From a start block, process moves to block 610 where a notification is received through an extension associated with the application. The extension may be incorporated into the application. At block 615, the appropriate actions are determined. At block 620, a determination is made whether to display information on a user interface of the extensible phone application. If not, the process ends. If so, process 600 goes to block 625 where the appropriate data are displayed by the extension. Then, process 600 ends.

Figure 7:
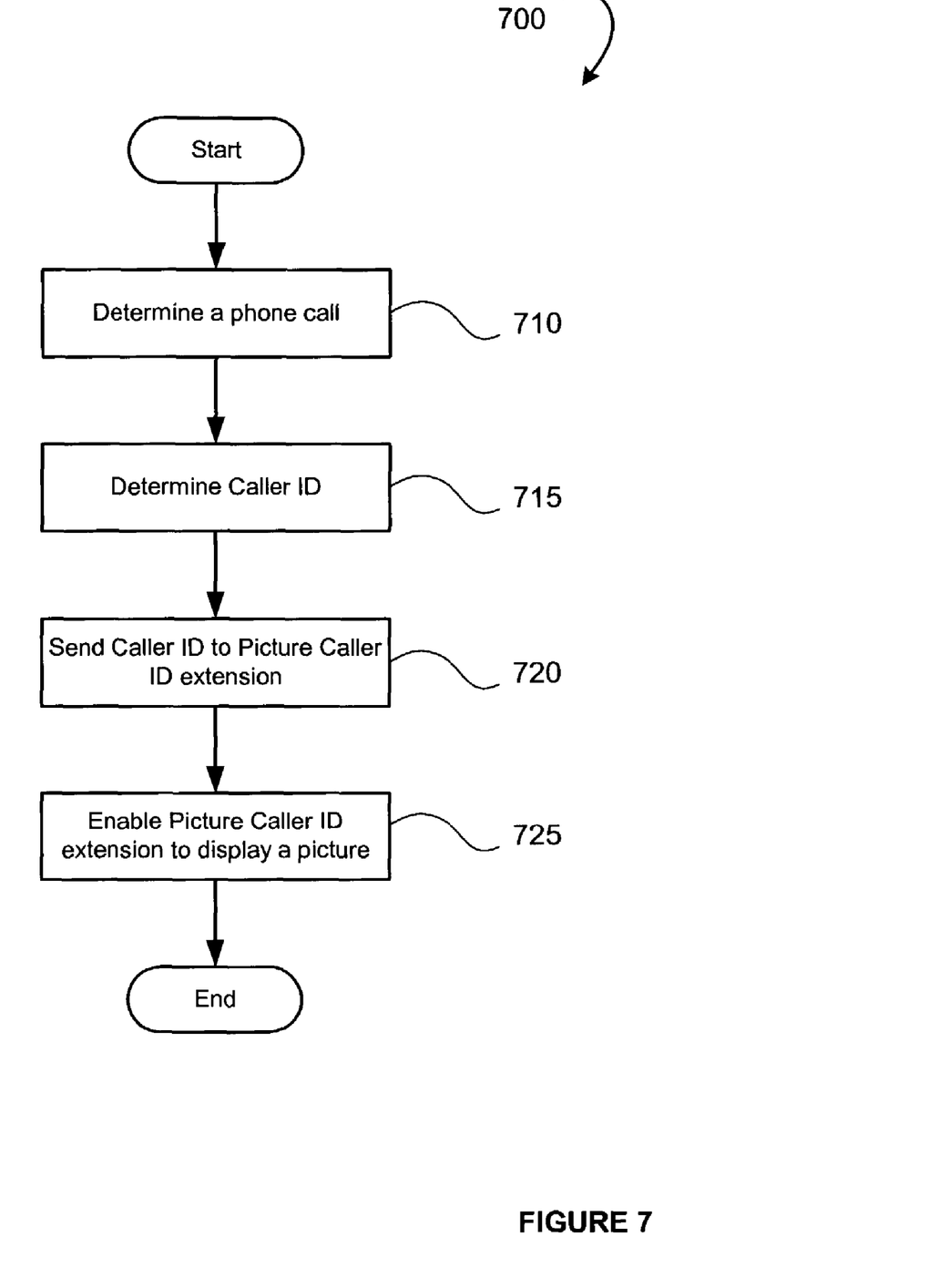
FIG. 7 is an operational flow diagram of an exemplary process that may be used by an extensible phone application to interact with a picture caller ID extension.

FIG. 7 is a schematic flow diagram of an exemplary process 700 that may be used by an extensible phone application to interact with a picture caller ID extension. From a start block, process 700 moves to block 710 where a phone call is determined. At block 715, the caller ID of the phone call is determined. At block 720, the caller ID is sent to the picture caller ID extension. At block 725, the call ID extension may display a digital picture of the caller on a user interface. Process 700 then ends.

Appendix A and Appendix B of this application include some exemplary program codes that may be used to implement this invention.

The above specification, examples and data provide a complete description of the invention. Since many embodiments of the invention can be made without departing from the spirit and scope of the invention, the invention resides in the claims hereinafter appended.

What is claimed is:

1. A computer-implemented method for configuring a phone application in a mobile communication device, the phone application being operable to handle wireless communication for the mobile communication device, the computer-implemented method comprising:
providing software allowing different applications on the device to register extensions with the phone application on the mobile device for interacting with the phone application comprising receiving notifications that are associated with wireless events handled by the phone application and controlling operations that are associated with the phone application;
enabling a software extension that is incorporated into a first application on the mobile device to register with the phone application on the device and enabling a software extension that is incorporated into a second application on the mobile device to register with the phone application on the device, the first application and the second application using the provided software for receiving a notification associated with a wireless event handled by the phone application such that the first application and the second application are able to access the wireless communications handled by the phone application; wherein each of the software extensions specifies a type of the wireless event within the registration; and
in response to an occurrence of the event being detected by the phone application, the phone application sending the notification including data about the wireless event to at least the software extension on the device that is associated with one of the first application and the second application; wherein the phone application communicates directly with the first application and the second application such that the first application and the second application are able to access the wireless communications handled by the phone application and control an operation of the phone application.

2. The computer-implemented method of claim 1, further comprising enabling the extension to display data on a user-interface; wherein the user-interface is a component of the phone application.

3. The computer-implemented method of claim 1, further comprising enabling the extension to send data to the phone application for processing.

4. The computer-implemented method of claim 1, further comprising permitting the extension to control an operation of the phone application.

5. The computer-implemented method of claim 1, wherein the event is associated with wireless communication.

6. The computer-implemented method of claim 1, wherein the notification includes data related to the event.

7. The computer-implemented method of claim 1, wherein the notification includes data associated with a call handled by the phone application.

8. The computer-implemented method of claim 1, further comprising enabling the extension to display a digital photograph on a user-interface in response to the event, the event being related to a call.

9. The computer-implemented method of claim 8, wherein the digital photograph is associated with a caller ID associated with the call.

10. A computer-implemented method for configuring a first application in a mobile communication device, the computer-implemented method comprising:
including a software extension in the first application on the mobile communication device and including a software extension in a second application on the mobile communication device, the extensions stored on the mobile communication device and being operable to communicate with an extensible phone application on the mobile communication device that is configured to handle wireless communication for the mobile communication device including sending and receiving calls such that the first application and the second application are able to access the wireless communications handled by the extensible phone application;

registering the extension of the first application and the second application with the extensible phone application on the mobile communication device using provided software that provides functionality for receiving communications from the extensible phone application and controlling operations that are associated with the extensible phone application; wherein a type of the wireless event is specified when registering; and in response to an occurrence of the event being detected by the phone application, the phone application sending the notification including data about the wireless event to at least the software extension on the device that is associated with one of the first application and the second application; wherein the phone application communicates directly with the first application and the second application such that the first application and the second application are able to access the wireless communications handled by the phone application and control an operation of the phone application.

11. The computer-implemented method of claim 10, wherein registering the extension with the extensible phone application includes requesting the notification in response to the wireless communication event.

12. The computer-implemented method of claim 10, wherein the wireless communication event is associated with a call handled by the extensible phone application.

13. The computer-implemented method of claim 10, wherein the operation includes configuring the extensible phone application to perform another operation.

14. The computer-implemented method of claim 10, wherein the operation includes sending data to the extensible phone application.

15. The computer-implemented method of claim 10, wherein the operation includes displaying data on a user-interface associated with the extensible phone application.

16. The computer-implemented method of claim 10, wherein the data is displayed without disrupting operations performed by the extensible phone application.

17. A computer-implemented method for configuring a mobile communication device comprising:

providing an extensible phone application to the mobile communication device, the extensible phone application being located on the device that is configured to handle wireless communication including receiving calls for the mobile communication device;

providing a first application and a second application to the mobile communication device, the first application and the second application being located on the device and wherein each of the first application and the second application is configured with a software extension for interacting directly with the extensible phone application such that the first application and the second application are able to access the wireless communications handled by the extensible phone application and control operations that are associated with the extensible phone application; wherein the wireless communications comprise:

registering the extension of the first application and the extension of the second application with the extensible phone application to receive a notification in response to an event; wherein a type of the wireless event is specified when registering with the extensible phone application; and in response to an occurrence of the event being detected by the phone application, the phone application sending the notification including data about the wireless event to at least the software extension on the device that is associated with one of the first application and the second application; wherein the phone application communicates directly with the first application and the second application such that the first application and the second application are able to access the wireless communications handled by the phone application and control an operation of the phone application.

18. The computer-implemented method of claim 17, wherein the wireless event is one of: a new call and a call ended.

19. The computer-implemented method of claim 18, wherein the operation includes displaying data in a user-interface provided by the extensible phone application.

20. The computer-implemented method of claim 19, wherein the event is associated with a call handled by the extensible phone application and wherein the notification includes a caller ID that identifies the call.

21. The computer-implemented method of claim 20, wherein the second application is further configured to display a digital photograph related to the caller ID on the user-interface.

22. A method of communicating between a first application and a second application and an extensible phone application in a mobile communication device, the method comprising:

sending, by the first application using a software extension that is incorporated into the first application, a first notification request for an event associated with wireless communication that is handled by the extensible phone application; wherein the software extension is registered with the extensible phone application on the mobile computing device; wherein the extensible phone application handles wireless communications including receiving calls for the mobile communication device;

sending, by the second application using a software extension that is incorporated into the second application, a first notification request for an event associated with wireless communication that is handled by the extensible phone application; wherein the software extension is registered with the extensible phone application on the mobile computing device; wherein the extensible phone application handles wireless communications including receiving calls for the mobile communication device;

directly receiving, by the extensible phone application, the notification request from the first application and the notification request from the second application;

determining, by the extensible phone application, an occurrence of the event identified in the notification request; and sending, by the extensible phone application, a notification associated with the event to at least one of the extension of the first application and the second application; wherein the extension, the first application, the second application and the entire the extensible phone application are located on the mobile communication device such that the first application is able to access the wireless communications handled by the extensible phone application and control an operation of the extensible phone application.

23. The method of claim 22, wherein the event is associated with a call handled by the extensible phone application.

24. The method of claim 23, wherein the notification includes a caller ID associated with the call.

25. The method of claim 22, further comprising:
receiving, by at least one of the first application and the second application using the extension, the notification;
determining, by at least one of the first application and the second application using the extension, data associated with the event; and
sending, by at least one of the first application and the second application using the extension, the data to the extensible phone application.

26. The method of claim 25, wherein the data includes a digital photograph.

27. A mobile communication device comprising:
a memory encoded with computer-executable components comprising:
an extensible phone application configured to handle wireless communication including receiving calls for the mobile communication device, the extensible phone application being further configured to determine an event related to wireless communication and to send a notification associated with the event directly to software extensions registered with the extensible phone application, the notification including data about the event; wherein a type of the wireless event for which to receive the notification is specified when registering with the extensible phone application; and
a first application on the mobile communication device including a software extension, the first application being further configured to receive the notification from the extensible phone application and to incorporate the data about the event in an operation performed by the first application such that the first application is able to access wireless communications handled by the extensible phone application and control an operation of the extensible phone application;
a second application on the mobile communication device including a software extension, the second application being further configured to receive the notification from the extensible phone application and to incorporate the data about the event in an operation performed by the second application such that the second application is able to access wireless communications handled by the extensible phone application and control an operation of the extensible phone application; wherein the extensible phone application, the entire first application and the second application and the extension are stored within the memory of the mobile communication device.

28. The mobile communication device of claim 27, wherein the second application is further configured to instruct the extensible phone application to perform another operation.

29. The mobile communication device of claim 27, wherein the event is related to a call and wherein the extensible phone application is further configured to determine a caller ID related to the call and to incorporate the caller ID in the notification.

30. The mobile communication device of claim 29, wherein the second application is further configured to determine a digital photograph related to the caller ID and to instruct the extensible phone application to display the digital photograph on a user-interface.

31. A memory encoded with a data structure comprising:
a first data field having a first computer-executable component configured to enable a software extension directly incorporated into a second computer-executable component and a software extension directly incorporated into a third computer-executable component on a mobile device to register with the first computer-executable component that is located on the mobile device and to send a notification associated with a wireless event handled by the first computer-executable component to the extension of at least one of the second computer-executable component and the third computer-executable component in response to the event; wherein a type of the wireless event is specified when registering; wherein the first computer-executable component is configured to receive calls;
a second data field having the second computer-executable component and the third computer-executable component that is located on the mobile device; and
a third data field incorporated into the second data field, the third data field having the extension configured with computer-executable instructions for interacting with the first computer-executable component such that the second computer-executable component and the third computer-executable component are able to access wireless communications handled by the first computer-executable component and control an operation of the first computer-executable component.

32. The memory of claim 31, wherein the first computer-executable component is an extensible phone application configured to handle wireless communication for a mobile communication device.

33. The memory of claim 31, wherein the extension is configured to control an operation performed by the first computer-executable component.

34. A mobile communication device configured with a phone application for handling wireless communication, the mobile communication device comprising:
means for enabling a first application and a second application in the mobile communication device each to use a software extension on the mobile communication device to directly register with the phone application on the mobile communication device for receiving a notification associated with a wireless event handled by the phone application; wherein a type of the wireless event is specified when registering; wherein the phone application is configured to receive calls; and
means for sending the notification including data about the wireless event directly from the phone application to the extension that is incorporated into the applications in response to the event such that at least one of the first application and the second application are able to access the wireless communications handled by the phone application and control an operation of the phone application.

35. The mobile communication device of claim 34, further comprising means for incorporate the extension in the other application.

36. The mobile communication device of claim 34, further comprising means for enabling the other application to control the phone application.

37. The mobile communication device of claim 34, further comprising means for the other application to display data in a user interface.

38. A mobile communication device comprising:
means for software extensions for a first application and a second application on a device to directly register with an extensible phone application on the device that handles wireless communication including receiving calls; wherein a type of the wireless event is specified when directly registering with the extensible phone application;

means for incorporating an extension into the first application and the second application on the device; and means for the extensible phone application to directly send a wireless event to at least one of the first application and the second application such that at least one of the first application and the second application is able to access the wireless communications handled by the extensible application and control an operation of the extensible phone application.

39. The mobile communication device of claim 38, further comprising means for an extension to display data on a user-interface.

40. The mobile communication device of claim 38, further comprising means for an extension to control the extensible phone application.

* * * * *